United States Patent [19]

Kim

[11] Patent Number: 5,514,998
[45] Date of Patent: May 7, 1996

[54] METHOD AND SYSTEM FOR DEMODULATING GMSK SIGNALS IN A CELLULAR DIGITAL PACKET DATA SYSTEM

[75] Inventor: Youngky Kim, Seoul, Rep. of Korea

[73] Assignee: Hughes Aircraft Company, Los Angeles, Calif.

[21] Appl. No.: 189,001

[22] Filed: Jan. 27, 1994

[51] Int. Cl.$^6$ .................. H04L 27/10; H04L 27/14
[52] U.S. Cl. ................ 329/300; 329/303; 375/336; 375/343; 375/262; 375/274; 375/341
[58] Field of Search .................... 329/300, 301, 329/302, 303, 304, 349, 346; 375/47, 90, 94, 96, 340, 341, 336, 343, 262, 274

[56] References Cited

U.S. PATENT DOCUMENTS

| | | | |
|---|---|---|---|
| 5,048,058 | 9/1991 | Kaleh | 375/47 |
| 5,111,482 | 5/1992 | Ohtake | 375/90 |
| 5,117,441 | 5/1992 | Weigand | 375/90 |
| 5,249,200 | 9/1993 | Chen et al. | 375/58 |
| 5,251,233 | 10/1993 | Labedz et al. | 375/94 X |
| 5,285,480 | 2/1994 | Chennakeshu et al. | 375/101 |
| 5,301,209 | 4/1994 | Wei | 375/39 |
| 5,311,545 | 5/1994 | Critchlow | 375/14 |
| 5,313,495 | 5/1994 | Kim | 375/341 |
| 5,316,677 | 6/1994 | Kim | 375/341 |
| 5,353,307 | 10/1994 | Lester et al. | 375/341 |

*Primary Examiner*—Robert J. Pascal
*Assistant Examiner*—Arnold Kinkead
*Attorney, Agent, or Firm*—Gordon R. Lindeen, III; Wanda K. Denson-Low

[57] ABSTRACT

A decision feedback multiple symbol differential demodulator for Gaussian filtered Minimum Shift Keying (GMSK) has a performance very close to theoretical limit even under a fading channel. The demodulator implements a noncoherent, maximum likelihood (ML) search over multiple bit-time intervals. The past bit decisions are fed back to the ML decision logic. The improved performance of the demodulator is achieved by using old decisions in the ML decision logic.

22 Claims, 2 Drawing Sheets

5,514,998

METHOD AND SYSTEM FOR DEMODULATING GMSK SIGNALS IN A CELLULAR DIGITAL PACKET DATA SYSTEM

DESCRIPTION

BACKGROUND OF THE INVENTION

1. Field of the Invention

The present invention generally relates to demodulators for communication systems and, more particularly, to a new non-coherent demodulator for a digital communication system which exhibits superior performance in a fading channel.

2. Description of the Prior Art

The modulation scheme for the Cellular Digital Packet Data (CDPD) system is Gaussian filtered Minimum Shift Keying (GMSK) with modulation index 0.5. There are several demodulation structures for GMSK such as a Frequency Modulation (FM) discriminator, coherent demodulation and differential demodulation. Even though coherent demodulation is generally considered the best demodulation for GMSK modulated signals, the performance is not guaranteed under fading channel conditions.

SUMMARY OF THE INVENTION

It is therefore an object of the present invention to provide a demodulation scheme for GMSK having a performance very close to theoretical limit even under fading channel.

According to the invention, there is provided a decision feedback multiple symbol differential demodulator which exhibits superior performance under a fading channel. The demodulator implements a non-coherent, maximum likelihood (ML) search over multiple bit-time intervals. The past bit decisions are fed back to the ML decision logic. The improved performance of the demodulator is achieved by using old decisions in the ML decision logic.

BRIEF DESCRIPTION OF THE DRAWINGS

The foregoing and other objects, aspects and advantages will be better understood from the following derailed description of a preferred embodiment of the invention with reference to the drawings, in which.

DETAILED DESCRIPTION OF A PREFERRED EMBODIMENT OF THE INVENTION

GMSK modulation with BT=0.5 can be regarded as MSK with negligible error (i.e., less than 0.2 dB loss in Additive White Gaussian Noise (AWGN)), where B is the bandwidth of the pre-modulation Gaussian filter and T is the bit time interval. In this application, T=52.0833 μsec (1/19200). There are two interpretations of MSK; one is to consider MSK as continuous phase Frequency Shift Keying (FSK), and the other is to consider MSK as offset Quadrature Phase Shift Keying (QPSK). Under the second interpretation, the signal can be expressed as $$s(t) = \sum_i dI(i)p(t-iTs) + j\sum_i dQ(i)p\left(t-iTs-\frac{Ts}{2}\right), \quad (1)$$

where s(t) is the complex envelope of the transmitted signal, dI(i) is the binary (+−1) information sequence for the I channel, dQ(i) is the binary information sequence for the Q channel, and Ts is 104.1666 μsec (i.e., Ts=2T=1/(19200/2)). And, p(t) is a pulse shaping function described as $$p(t) = \cos\left(\frac{\pi t}{Ts}\right) \quad \text{for } |t| \leq \frac{Ts}{2} \quad (2)$$

$$p(t) = 0 \quad \text{for } |t| > \frac{Ts}{2}$$

For the demodulator design according to the present invention, the second interpretation is used. The underlying idea of this demodulator is to find the maximum likelihood Di(i) under the given decisions on {dQ(i-1), dI(i-1), dQ(i-2), dQ(i-D)} and the received signal, z(t), from t=iTs-DTs to t=Its+FTs+Ts/2. The demodulator algorithm realizing this idea can be described as Choose Di(i) maximizing $$\left| \sum_{k=i-D+1}^{i+F} dI(k)Z(k) + j \sum_{k=i-D}^{i+F-1} dQ(k)Z(k+1) \right|, \quad (3)$$

Given {dQ(i-1), dI(i-1), dQ(i-2), dQ(i-D)}

Among all combinations of {dI(i), dQ(i), dI(i+F)}, where D and F are chosen as 4 and 1, $$Z(2k) = \int conjg(z(t))p(t-kTs)dt \quad (4)$$

$$Z(2k+1) = \int conjg(z(t))p\left(t-kTs-\frac{Ts}{2}\right)dt$$

Figure 1:
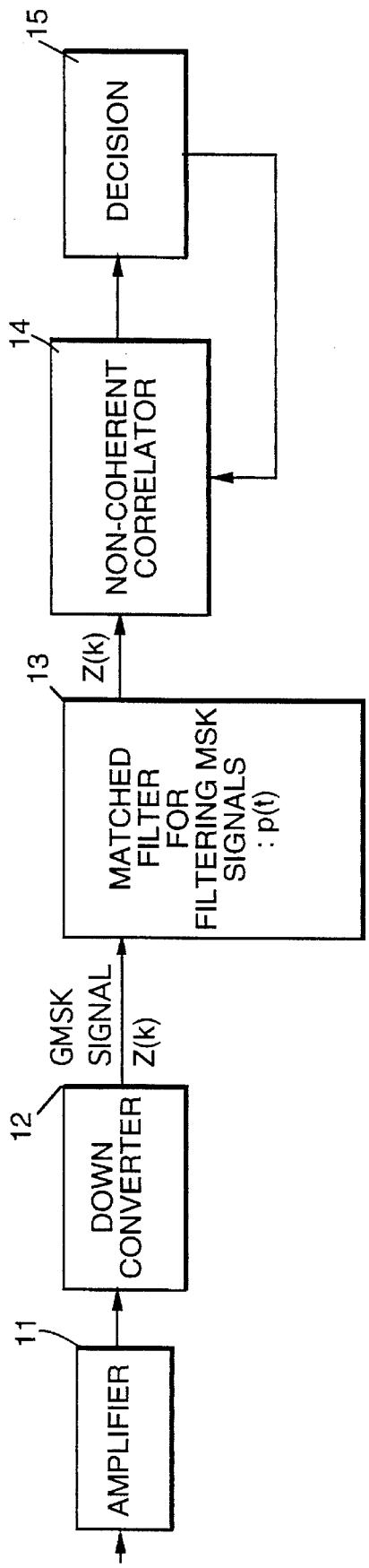
FIG. 1 is a block diagram of the decision feedback multiple symbol differential demodulator according to the invention as used in a digital communication system.

Referring now to the drawings, and more particularly to FIG. 1, there is shown the demodulator based on this algorithm. The signal from antenna 10 is amplified in amplifier 11 and then subject to down conversion in down converter 12 to recover signal z(k). This signal is first passed though matched filter 13 before being supplied to non-coherent correlator 14. The output of the correlator 14 is supplied to Maximum Likelihood (ML) decision logic 15 which outputs decision d(i) and feeds back d(i-1) to the correlator.

Figure 2:
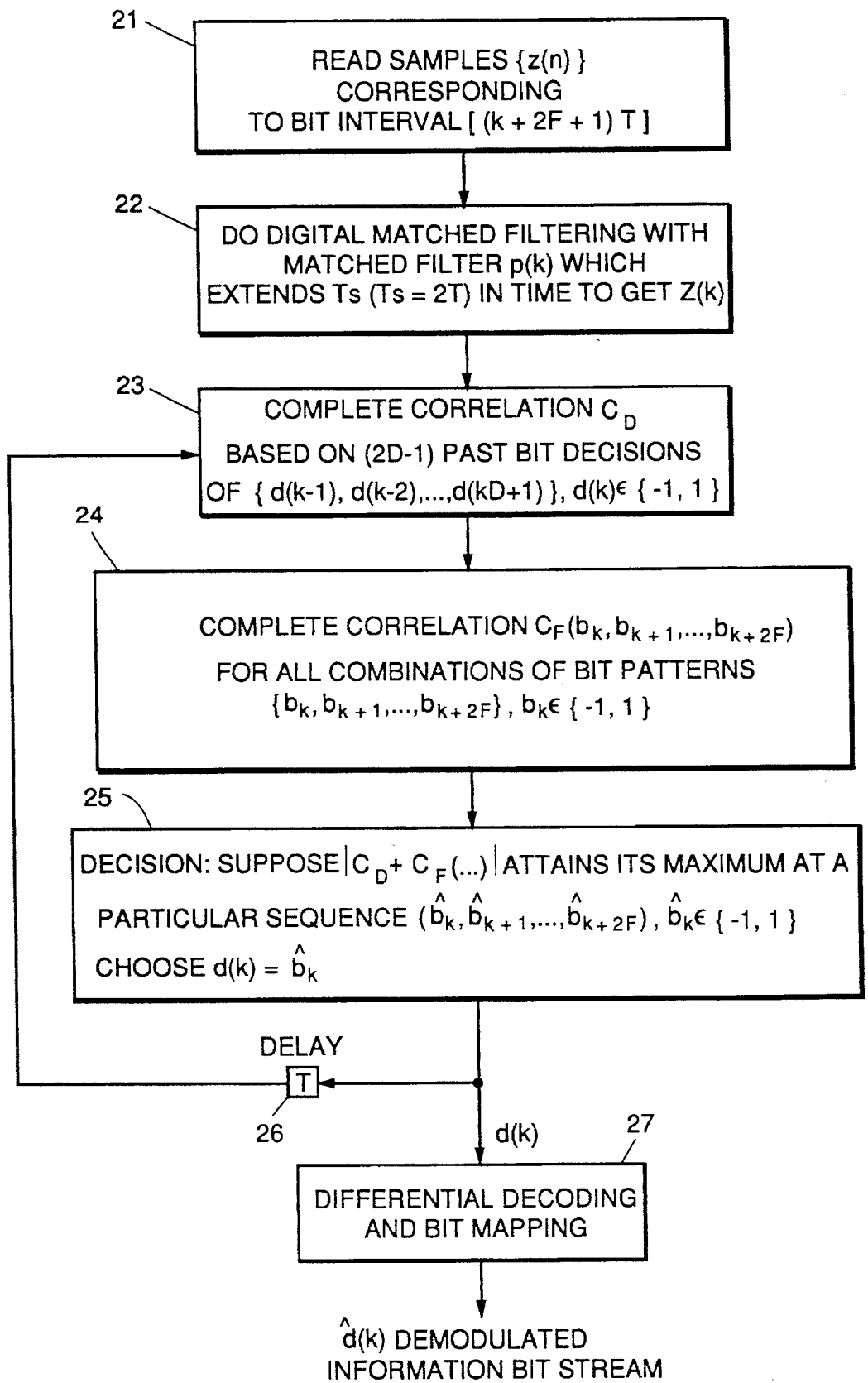
FIG. 2 is a flow diagram illustrating the logic of the firmware which implements the demodulator according to the invention in a digital signal processor.

The invention is implemented in a commercially available Digital Signal Processor (DSP), such as the Texas Instruments TMS320 family of DSPs. The DSP implements interpolation and phase rotation which can be considered as a part of down converter 12, the matched filter 13, the non-coherent correlator 14 and the ML decision logic 15. FIG. 2 is a flow diagram of the firmware which implements the invention on the DSP. In function block 21, the samples {z(n)} corresponding to bit interval [(k+2F)T, (k+2F+1)T] are read, interpolated and phase-rotated. Note that these functions are performed per bit interval. For digital matched filter implementations, z(t) should be appropriately sampled; i.e., $$z(n) = z\left(\frac{n}{NT}\right),$$

where n is an integer, N is the number of samples per bit, and T is the bit time interval. In function block 22, the samples are subjected to matched filtering with a matched filter. This is a realization of equation (4) where the digital filter performs $$Z(k) = \sum_{k=1}^{2N} conjg((z(k+n))p(n),$$

where $$p(k) = \begin{cases} \sin\left(\frac{\pi k}{2N}\right) & \text{if } k = 1, 2, \ldots, 2N \\ 0 & \text{otherwise} \end{cases}$$

Note that match filtering is done over a 2-bit time period. In function block 23, the correlation, $C_D$, based on 2D-1 past bit decisions of $\{d(k-1), d(k-2), \ldots, d(k-2D+1)\}$, $d(k) \epsilon \{-1,1\}$, is computed. Here, $$C_D = \sum_{n=1}^{2D-1} f(d(k-n))Z(k-n),$$

where $$f(d(k)) = \begin{cases} d(k) & \text{if } k = \text{even} \\ jd(k) & \text{if } k = \text{odd} \end{cases}$$

In function block 24, the correlation, $C_F$ ($b_k, b_{k+1}, \ldots, b_{k+2F}$), for all combinations of bit patterns is computed, where $$C_F = \sum_{n=0}^{2F} f(b_{k+n})Z(k+n).$$

A maximum likelihood decision is made in function block 25 based on the computed correlations $C_D$ and $C_F$. The output is d(k) which is fed back via a one bit period delay 26, T, as d(k-1) to function block 23 to compute the next correlation $C_D$. The output d(k) is also fed to function block 27 where differential decoding and bit mapping are performed to derive output $\hat{a}(k)$, which is the demodulated information bit stream. To get the binary sequence of {0,1}, the following mapping rule is used:

−1→0
1→1 where → represents the mapping function. The information bit stream is determined by the following differential decoding:

$$\hat{a}(k) = \begin{cases} d(k) \oplus d(k-1) & \text{if } k \text{ is even} \\ \overline{d(k) \oplus d(k-1)} & \text{if } k \text{ is odd} \end{cases}$$

It should be noted that if the sequence d(k) were represented as a binary sequence of {0,1} through bit mapping, then the differential decoding rule is the following:

$$\hat{a}(k) = \begin{cases} -d(k)d(k-1) & \text{if } k \text{ is even} \\ \overline{d(k)d(k-1)} & \text{if } k \text{ is odd} \end{cases}$$

where the operator $\oplus$ represents the Exclusive OR function and the over bar represents the complement.

Feedback of previous bit decisions to the computation of correlations provides several advantages. First, it improves the performance of the demodulator. Second, it reduces the computational loads, especially if the observation interval increases. For example, without decision feedback, nine bits of ML search would require $2^9 = 512$ correlation computations (if we extract eight bits from them, it still requires 512/8=64 correlation computations per bit), but with 6-bit feedback, only eight correlation computations are necessary.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A decision feedback multiple symbol differential demodulator for Gaussian filtered Minimum Shift Keying (GMSK) comprising:

a matched filter used to filter Minimum Shift Keying (MSK) signals, the matched filter receiving samples of a GMSK signal, {z(n)} and filtering the GMSK signal as an MSK signal;

a non-coherent correlator connected to receive an output of the matched filter and computing a correlation, $C_D$, based on (2D-1) past bit decisions }d(k-1), d(k-2), ... , d(k-2D+1)}, $d(k) \epsilon \{-1,1\}$; and maximum likelihood decision logic connected to receive correlation outputs and selecting a bit d(k) as an output of the differential demodulator and feeding back the selected bit d(k) to the non-coherent correlator.

2. The demodulator recited in claim 1 wherein said matched filter filters the sampled received signal according to $$Z(k) = \sum_{k=1}^{2N} conjg((z(k+n))p(n),$$

where $$p(k) = \begin{cases} \sin\left(\frac{\pi k}{2N}\right) & \text{if } k = 1, 2, \ldots, 2N \\ 0 & \text{otherwise.} \end{cases}$$

3. The demodulator recited in claim 2 wherein said non-coherent correlator computes $$C_D = \sum_{n=1}^{2D-1} f(d(k-n))Z(k-n).$$

4. The demodulator recited in claim 3 wherein said non-coherent correlator further computes the correlation, $C_F$ ($b, b_{+1}, \ldots, b_{+2F}$), for all combinations of bit patterns, where $$C_F = \sum_{n=0}^{2F} f(b_{k+n})Z(k+n)$$

and the maximum likelihood decision logic chooses $d(k)=b_k$, for correlation computations that attain a maximum for a sequence ($b_k, b_{k+1}, \ldots, b_{k+2F}$), $b_k \epsilon \{-1,1\}$.

5. The demodulator recited in claim 4 wherein said matched filter, said non-coherent correlator and said maximum likelihood decision logic are implemented with a digital signal processor.

6. A method of demodulating Gaussian filtered Minimum Shift Keying (GMSK) signals comprising the steps of:

filtering a sampled received GMSK signal, {z(n)} as a Minimum Shift Keying (MSK) signal, in a matched filter used to filter MSK signals;

computing a correlation $C_D$, of an output of the matched filter based on (2D-1) past bit decision {d(k-1), d(k-2), ... , d(k-2D+1)}, d(k)$\epsilon$}−1,1}; and selecting a bit d(k) from correlation outputs, $C_D$, using maximum likelihood decision logic connected to receive correlation outputs, C, and feeding back the selected bit to perform the step of computing the correlation outputs, $C_D$.

7. The method of demodulating recited in claim 6 wherein said matched filter filters the sampled received signal according to $$Z(k) = \sum_{k=1}^{2N} conjg((z(k+n))p(n),$$

where $$p(k) = \begin{cases} \sin\left(\dfrac{\pi k}{2N}\right) & \text{if } k = 1, 2, \ldots, 2N \\ 0 & \text{otherwise.} \end{cases}$$

8. The method of demodulating recited in claim 7 wherein the step of computing the correlation, $C_D$, is performed according to $$C_D = \sum_{n=1}^{2D-1} f(d(k-n))Z(k-n).$$

9. The method of demodulating recited in claim 8 further comprising the step of computing a correlation, $C_F$ ($b$, $b_{+1}$, ..., $b_{+2F}$), for all combinations of bit patterns, where $$C_F = \sum_{n=0}^{2F} f(b_{k+n})Z(k+n)$$

and the maximum likelihood decision logic chooses $d(k)=b_k$, for correlation computations that attain a maximum for a sequence ($b_k$, $b_{k+1}$, ..., $b_{k+2F}$), $b_k \in \{-1,1\}$.

10. The method of demodulating recited in claim 9 further comprising the steps of differentially decoding and bit mapping d(k) to generate a demodulated bit stream.

11. A device for demodulating Gaussian filtered Minimum Shift Keying (GMSK) signals comprising:
 a matched filter for receiving samples of a GMSK signal and filtering the GMSK signal as a Minimum Shift Keying (MSK) signal;
 a correlator connected to receive an output of the matched filter and computing a correlation based on at least one previously selected bit; and
 maximum likelihood decision logic connected to receive correlation outputs, select a selected bit, and feed back the selected bit to the correlator.

12. The device of claim 11, wherein said correlator computes a first correlation by summing a sequence of multiplications of the output of the matched filter with a first correlation function based on at least one previously selected bit.

13. The device of claim 12, wherein said correlator further computes a second correlation for at least one bit pattern combination, said second correlation derived from a multiplication of the output of the matched filter and said at least one bit pattern combination.

14. The device of claim 11, wherein said matched filter sums a sequence of multiplications between a conjugated sequence indicative of said samples of a GMSK signal and a sequence derived from a sinusoidal function.

15. The device recited in claim 11 further comprising logic for performing differential decoding and bit mapping on said selected bit.

16. The device recited in claim 11 wherein said device is implemented with a digital signal processor.

17. A device for processing a received signal, said device comprising:
 an amplifier for amplifying the received signal;
 a down converter connected to said amplifier for recovering a Gaussian filtered Minimum Shift Keying (GMSK) signal from said received signal;
 a matched filter used to filter Minimum Shift Keying (MSK) signals, said filter connected to receive said GMSK signal and filtering said GMSK signal as an MSK signal;
 a correlator connected to receive an output of the matched filter and computing correlation outputs based on past bit decisions; and
 maximum likelihood decision logic connected to receive said correlation outputs, said decision logic for selecting a selected bit, feeding back the selected bit to the correlator, and including said selected bit as a decision output.

18. A method of demodulating Gaussian filtered Minimum Shift Keying (GMSK) signals comprising the steps of:
 receiving a GMSK signal;
 filtering said GMSK signal in a matched filter used to filter Minimum Shift Keying (MSK) signals;
 computing a correlation output from said filtered signal;
 selecting a selected bit using maximum likelihood decision logic connected to receive said correlation output;
 feeding back the selected bit to perform the step of computing said correlation output; and
 including said selected bit in a decision output.

19. The method of demodulating recited in claim 18 wherein the step of computing a correlation output is performed by computing a first correlation by summing a sequence of multiplications of the output of the matched filter with a first correlation function based on past bit decisions.

20. The method of demodulating recited in claim 19 wherein the step of computing a correlation output further comprises computing a second correlation for at least one bit pattern combination, said second correlation derived from a multiplication of the output of the matched filter and said at least one bit pattern combination.

21. The method of demodulating recited in claim 18 wherein the step of filtering said GMSK signal is performed by summing a sequence of multiplications between a conjugated sequence indicative of said GMSK signal and a sequence derived from a sinusoidal function.

22. The method of demodulating GMSK signals recited in claim 18 further comprising the steps of differentially decoding and bit mapping the decision output to produce demodulated bit stream output.

* * * * *

UNITED STATES PATENT AND TRADEMARK OFFICE
CERTIFICATE OF CORRECTION

PATENT NO. : 5,514,998
DATED : May 7, 1996
INVENTOR(S) : Youngky Kim and In-Kyung Kim It is certified that error appears in the above-identified patent and that said Letters Patent is hereby corrected as shown below:

On the cover page, at Section [75], the Inventors should read:

--Youngky Kim, Seoul, Rep. of Korea
In-Kyung Kim, Potomac, Md.--

Signed and Sealed this

Twenty-fourth Day of December, 1996

*Attest:*

BRUCE LEHMAN

*Attesting Officer*    *Commissioner of Patents and Trademarks*